March 15, 1932.  E. B. FORSE ET AL  1,849,289
REFRACTORY CONTAINING SILICON CARBIDE AND METHOD OF MAKING THE SAME
Filed May 11, 1928
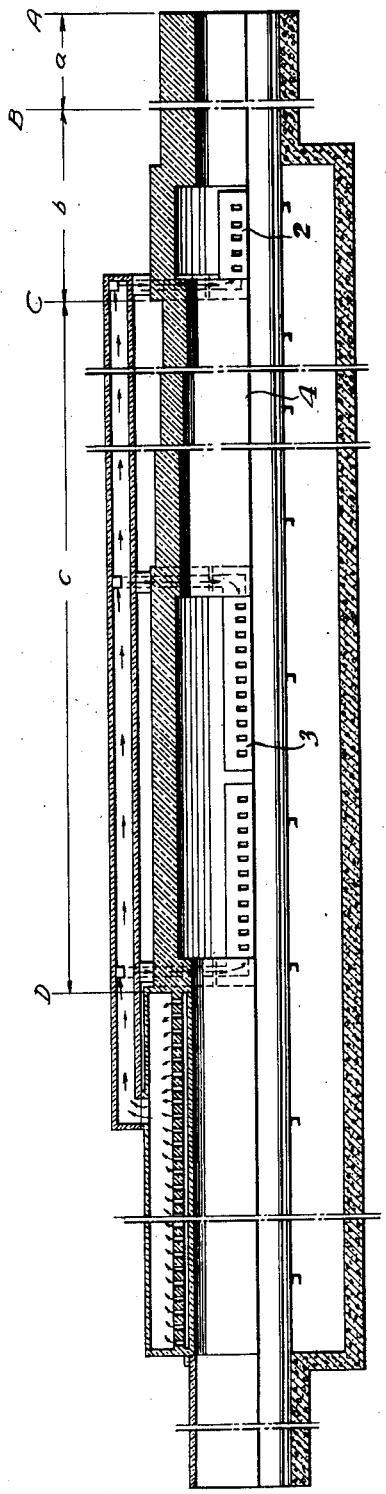
INVENTORS
Edwin B. Forse
Charles F. Geiger
by their attorneys
Byrnes, Stebbins, Parmelee Patented Mar. 15, 1932

1,849,289

UNITED STATES PATENT OFFICE

EDWIN B. FORSE AND CHARLES F. GEIGER, OF METUCHEN, NEW JERSEY

REFRACTORY CONTAINING SILICON CARBIDE AND METHOD OF MAKING THE SAME

Application filed May 11, 1928. Serial No. 276,852.

This invention relates to the art of ceramics, and more particularly to an article formed wholly or in part of silicon carbide, and to a method for the manufacture thereof.

In the manufacture of articles, such as refractory blocks from silicon carbide, such for instance as disclosed in Patent No. 772,262, of October 11, 1904, to F. J. Tone, it has been found in the usual run of silicon carbide grains not specially purified, that there are carbonaceous centers. Such centers represent an extremely small percentage of carbon when measured by analytical methods, but have been found to be very deleterious in a bonded article in that the bond does not properly vitrify around such centers and hence premature disintegration of the refractory results in the subsequent use thereof. In the usual method of burning, these carbonaceous centers are removed, but the removal thereof is accompanied by the oxidation of a considerable amount of silicon carbide itself, and this, of course, is not desirable. If on the other hand, oxidation is entirely prevented by burning in a reducing atmosphere, the strength of the bonded article is adversely effected.

According to the present invention, we have developed a ceramic article and a method of producing the same wherein the removal of the carbonaceous centers is effected without the oxidation of any considerable amount of the silicon carbide, the resulting product having a modulus of rupture at elevated temperatures considerably above the modulus of rupture of a similar article burned in accordance with the ordinary method of firing.

The invention may be readily understood by reference to the accompanying drawing which shows diagrammatically a furnace or kiln for practicing the invention.

In the drawing we have shown a kiln similar to that disclosed in our copending application Serial No. 276,222, filed May 9, 1928, for an improvement in tunnel kilns and method of operating the same. While this type of kiln is especially adapted to the carrying out of the present invention, it will be understood that the invention is not limited to use with any particular kiln construction, and the structure disclosed is for the purpose of illustrating one suitable apparatus for carrying out the invention.

The kiln as disclosed, is divided into a plurality of sections or zones. At the entrance to the kiln is a drying and preheating zone which is designated $a$ and which extends from substantially the entrance A to point B. From B to C is a decarbonizing zone $b$, and this is followed with a maturing zone $c$ between C and D. From D to the end of the kiln is a cooling zone. The kiln is of the continuous type having cars on which the ware is supported as it passes along the tunnel. The construction and arrangement of cars in this way is well known and understood in the art.

The drying and preheating zone, which for the purposes of the present invention, might be a separate structure altogether, can be heated in any suitable way. Where it is located in the tunnel kiln in advance of the decarbonizing zone, it is heated by gases and air flowing into it from said zone. The decarbonizing zone is provided with one or more radiating combustion chambers 2 of suitable dimension. These chambers discharge gases of combustion into the tunnel passage. By regulating the amount of air supplied thereto, the atmosphere in this portion of the kiln can be highly oxidizing. Located in the maturing zone are other radiating combustion units 3. These may also be arranged to discharge gases of combustion, or incompletely burned fuel into the tunnel kiln.

Starting with the preheating zone the temperature is controlled in such manner that as the cars enter, the temperature of the ware is increased at a rate preferably not exceeding substantially 50° C. per hour until approximately 800° C. is reached. The temperature in the ensuing or decarbonizing zone is maintained at between 600° and 900° C. and the ware is kept in this zone at least thirty-six and preferably forty-eight hours. The atmosphere in this zone is an oxidizing one. In this way carbonaceous material is removed completely from refractories or articles up to four inches in thickness, while the silicon carbide is not oxidized to any appreciable extent, the temperature being below the oxidizing temperature for silicon carbide.

After the carbon has been removed, we find it desirable to raise the temperature of the ware as rapidly as possible in approximately neutral atmosphere containing not over 5% of free oxygen until a temperature of at least 1200° C. is reached. This temperature is maintained until the bond is matured, this requiring in general at least six hours. Fired in this way the ceramic bond is matured with a minimum oxidation of the silicon carbide and the development of great strength in the bonded articles. Following the maturing zone, the refractories enter the cooling zone where they are cooled as rapidly as possible to a temperature of approximately 500° C. after which the rate of cooling is retarded until the end of the kiln is reached.

As illustrating the advantages of burning silicon carbide refractories in the above manner rather than in the normal way in which an oxidizing atmosphere is maintained in the maturing zone, the following figures are given which we find to be a representative of such refractories bonded with fine silicon carbide in accord with said United States patent to Tone, No. 772,262.

| Burning method | % SiO$_2$ (silica) | Mod. rupture at 1350° C. |
|---|---|---|
| As herein described | 10.0 | 1425#/in$^2$ |
| Normal | 15.6 | 1140 |

If 2½% of feldspar is added to produce a more vitreous mix the hot strength is slightly decreased, the figures showing:

| Burning | % SiO$_2$ | Mod. rupture |
|---|---|---|
| As herein described | 9.9 | 1091#/in$^2$ |
| Normal | 12.6 | 763 |

From these figures it will be seen that the modulus of rupture at a temperature of 1350° C. is much greater for a refractory burned in accordance with the present method than for one fired in the usual manner, while the percent of silicon oxide formed from the oxidation of the silicon carbide is materially lowered. The advantage of the relatively long decarbonizing period as herein specified lies in the complete removal of dark carbonaceous centers from the refractories without excessive oxidation of the SiC. Such centers represent an extremely small percentage of carbon when measured by analytical methods, but have been found to be very deleterious in that the bond does not vitrify properly in that section of the refractory and hence premature disintegration of the refractory results when the material is subsequently used. Such centers are also removed in the usual method of burning, but not without considerable oxidation of the SiC, which of course is not desirable. If such oxidation is prevented by burning in a reducing atmosphere, the strength of the article is adversely effected. The method herein described produces a commercial ceramic bonded silicon carbide refractory from ordinary run of mill grain not specifically purified, which refractory has simultaneously a silica content of not over 10% and a modulus of rupture at 1350° C. in excess of 1000 pounds per square inch.

We claim:

1. A silicon carbide refractory having a modulus of rupture at 1350° C. in excess of 1000 pounds per square inch and having a silica content of less than 12%, and from which free carbon has been removed under conditions preventing substantial oxidation of the silicon carbide.

2. A ceramic bonded article containing silicon carbide having a modulus of rupture at 1350° C. in excess of 1000 pounds per square inch and a silica content of less than 12%, and from which free carbon has been removed under conditions preventing substantial oxidation of the silicon carbide.

3. As a new article of manufacture, a ceramically bonded silicon carbide refractory having the characteristics of a silicon carbide refractory which has been heated to a temperature between substantially 600° and 900° C. while being maintained in an oxidizing atmosphere for a period of time sufficient to substantially remove free carbonaceous material therefrom and which has thereafter been fired at a higher temperature under substantially non-oxidizing conditions to mature the bond.

4. The process of burning a silicon carbide refractory article formed from silicon carbide and a ceramic bond which comprises holding the article in an oxidizing atmosphere at a temperature below the temperature of rapid oxidation of silicon carbide and below the temperature at which the bond matures but at a temperature at which free carbon and carbonaceous temporary binders will oxidize and for a length of time sufficient to remove such free carbon and carbonaceous material from the article, and thereafter heating the article to the maturing temperature of the bond to complete the firing thereof.

5. The process of burning a silicon carbide refractory comprised of silicon carbide grains and a ceramic bond, which comprises the steps of preheating the article to dry it, maintaining the article in an oxidizing atmosphere for a length of time sufficient to burn out free carbon and carbonaceous temporary binders from throughout the article at a temperature not exceeding 900° C., and thereafter rapidly raising the temperature of the article in a non-oxidizing atmosphere to the maturing temperature of the bond to complete the firing thereof.

In testimony whereof we have hereunto set our hands.

EDWIN B. FORSE.
CHARLES F. GEIGER.